Dec. 27, 1955  P. F. RADOCY  2,728,324
POULTRY PERCHING AND NESTING EQUIPMENT
Filed March 20, 1951  3 Sheets-Sheet 1
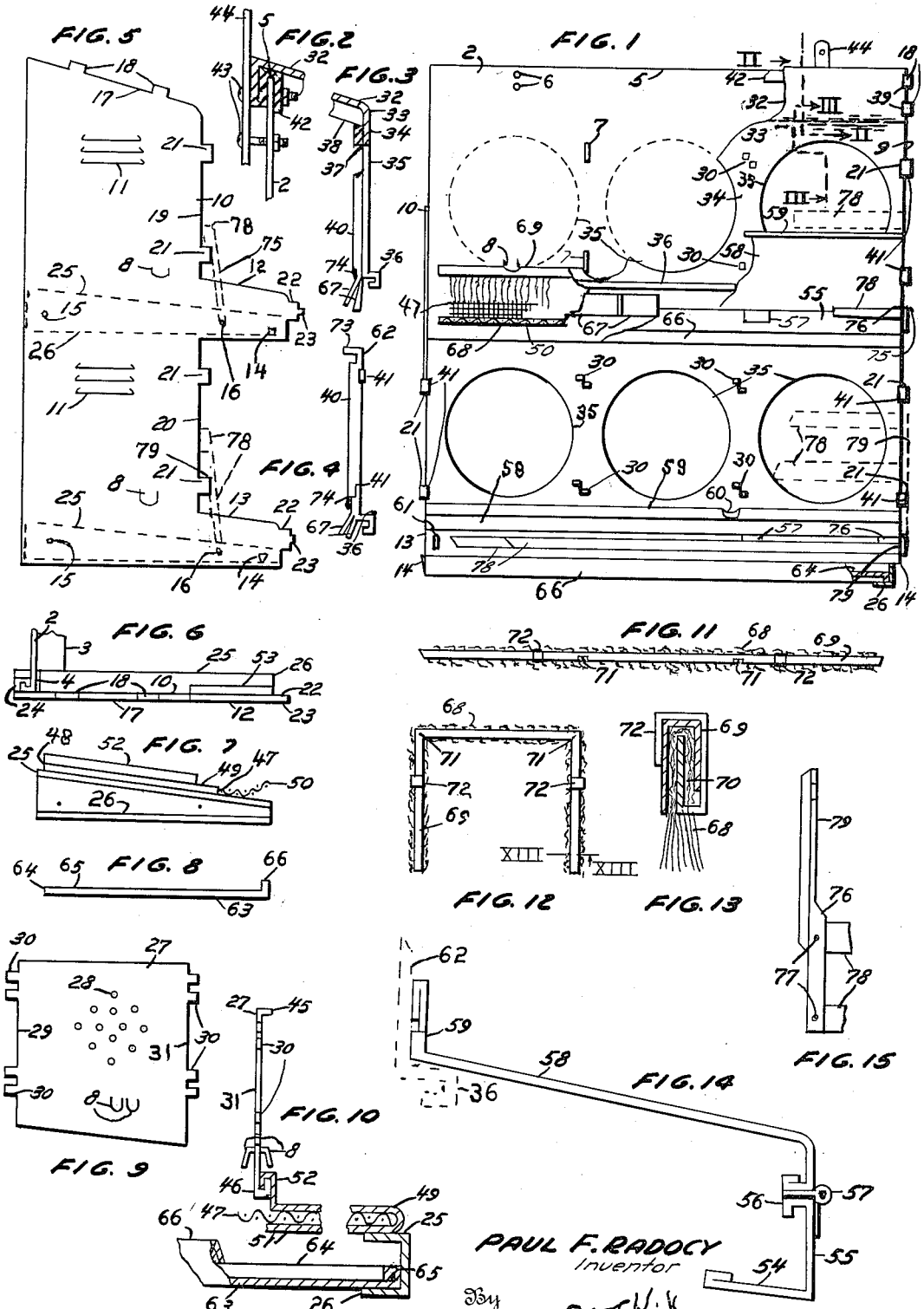

Dec. 27, 1955　　　　P. F. RADOCY　　　　2,728,324
POULTRY PERCHING AND NESTING EQUIPMENT
Filed March 20, 1951　　　　　　　　　　　　3 Sheets-Sheet 2

Inventor
PAUL F. RADOCY
By Geo E Kirk
Attorney

Dec. 27, 1955          P. F. RADOCY          2,728,324
POULTRY PERCHING AND NESTING EQUIPMENT
Filed March 20, 1951          3 Sheets—Sheet 3

INVENTOR:
PAUL F. RADOCY.
BY Hugh A. Kirk
ATTY.

United States Patent Office 2,728,324
Patented Dec. 27, 1955

2,728,324
POULTRY PERCHING AND NESTING EQUIPMENT

Paul F. Radocy, Rossford, Ohio

Application March 20, 1951, Serial No. 216,605

8 Claims. (Cl. 119—45)

This invention relates to a poultry machine and nesting device. More particularly, it deals with a knock-down sheet metal two-story multi-nest structure for egg laying poultry having special egg collecting compartments and perches for the poultry adjacent each nest opening.

It is an object of this invention to provide a simple, efficient, effective, economic, sanitary and fireproof multi-nest and perch structure for egg laying poultry.

Another object is to produce such a structure in which compartments are provided for the reception of eggs, into which compartments the eggs roll immediately after they are laid to be clear of the nests and droppings that may occur within the nests.

Another object is to produce such a poultry nesting and perching structure which may be shipped knocked down in a substantially flat compact container, and may be easily assembled substantially without tools by fitting the parts together and bending over sheet metal tabs or lugs in their corresponding slot seats.

Another object is to provide such a structure in which the perch adjacent each of the nests may be also employed as a closure for the entrance of the nest to either lock the fowl in or out of the nest when the perch is out of its perch providing position or eggs are being gathered from the egg receiving compartments.

Another object is to produce such a structure having a soft flexible material for lining each of the nests.

Another object is to produce such a structure in which sanitary removable trays are provided below the nests for collecting the droppings from the poultry.

Generally speaking, the perching and nesting device of this invention comprises a two-story multi-nest structure of sheet metal having a flat back portion which may be provided with means for hanging or supporting the structure on a wall, two vertical end portions, a sloping top portion, two coplanar front portions each having a series of nest openings therein, parallel vertical partitions between each of the nest openings, and a removable tray or droppings pan below each horizontal row of nests. Beneath and projecting out in front of the nest row openings are egg receiving compartments or troughs having longitudinally hinged lids or covers. Adjacent the ends of each egg carrying compartment may be pivoted a perch rail which when in its vertical position blocks the entrances or openings to the nests, and when in its horizontal position acts as a perch bar in front of each row of nests.

The sheet metal partitions and side or end portions are provided with bendable lugs which fit into cooperating slots for easy assembly of the structure. The bottom of the nest is preferably provided with an inclined screen or metallic mesh material, which slopes downwardly toward the egg receiving compartment and through which screen the droppings may readily fall onto the trays. The interior of each of the nests may be lined with a soft flexible material, such as hemp fibers; and a flexible flap, such as of rubber, may be provided between the one side of the interior of the nest and its adjacent cooperating egg receiving compartment, which flap readily permits the egg to roll by it. The end portions and the partitions between the nests may be provided with louvers or apertures for ventilation purposes.

The above mentioned and other features and objects of this invention and the manner of attaining them are given more specific disclosure in the following description of an embodiment of this invention taken in conjunction with the accompanying drawings, wherein:

Fig. 1 is a front elevation of an assembled multi-nest unit with parts thereof broken away to show the interior of the structure;

Fig. 2 is an enlarged section of the upper edge of the structure taken along line II—II of Fig. 1 showing the mounting for a hanging bracket;

Fig. 3 is an enlarged vertical section along the upper front portion of the structure taken along line III—III in Fig. 1;

Fig. 4 is an end or edge elevation of the lower front nest entrance portion similar to that for the upper front portion shown in Fig. 3;

Fig. 5 is a plan of the unassembled left end portion of the structure shown in Fig. 1;

Fig. 6 is a top edge view of the end portion shown in Fig. 5 showing how the back portion interlocks with the flanged rear edge of the end portion;

Fig. 7 is an inside elevation of a flange diverging slideway member which is mounted inside each end portion to support the mesh-work bottom and droppings trays of the nests;

Fig. 8 is an end view of a droppings pan or tray adapted to slide along the lower horizontal flange of the member shown in Fig. 7;

Fig. 9 is a side elevation of an unassembled vertical partition employed between the adjacent nests and provided with tabs or lugs at its edges for mounting in slot seats in the front and back portions of the structure;

Fig. 10 is an edge elevation of one partition looking from the right toward Fig. 9 showing its cooperation with the mesh-work bottom, egg tray screen and droppings pan, the latter in Fig. 8;

Fig. 11 is a top plan view of an unassembled and unbent hemp fiber carrier strip for lining three sides of a nest;

Fig. 12 is a top plan view of the strip shown in Fig. 11 bent into a U-shaped form for fitting against the back and two sides of a nest;

Fig. 13 is an enlarged vertical section taken along line XIII—XIII of Fig. 12 of the hemp fiber lining strip for a nest;

Fig. 14 is an enlarged end elevation of the lid or cover for an egg carrying compartment and its front supporting strip, with its cooperating front portion of the structure shown in dotted lines;

Fig. 15 is a plan view of the lower end left perch mounting arm, with the major portion of the perch bars broken away;

Figure 18:
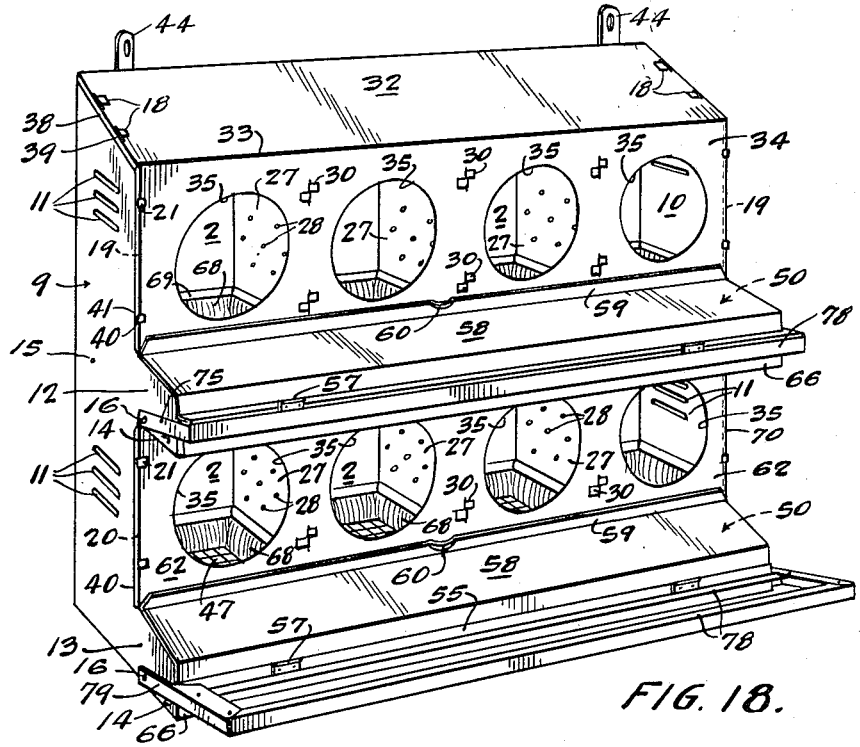
Figure 19:
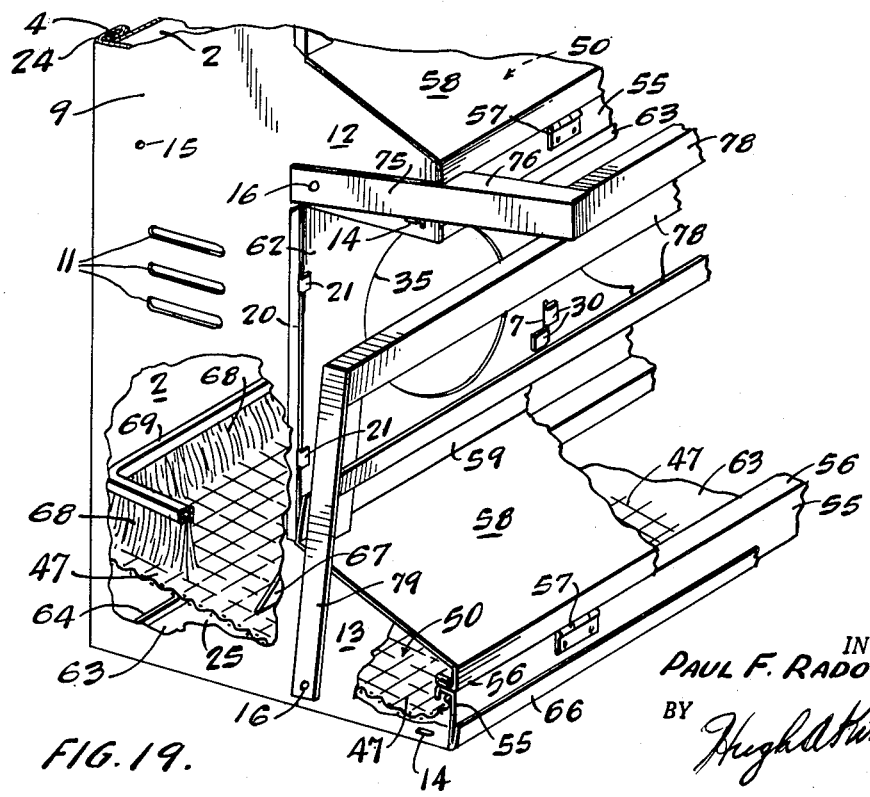

Fig. 18 is a full perspective view of an eight nest two-story assembled structure according to this invention; and Fig. 19 is an enlarged detailed perspective view of the lower left corner of the assembled structure shown in Fig. 18, with parts broken away to show the interior of the nest structure, and with the lower perch bar shown in its vertical position closing the entrance to the lower row of nest openings.

The features and functions of the structure of this invention as a whole and as shown assembled in Figs. 18 and 19 will first be described before referring to the detail features of the parts shown to different scales in the previous figures.

A two-story eight-nest structure having two horizontal rows of four similar nests with separate egg carrying compartments projecting below and in front of each horizontal row of nests is shown assembled in Fig. 18. This structure comprises essentially a closed flat back portion or section 2 to the side edges of which are fastened vertically parallel side or end portions or sections 9 and 10 having a pair of forward projecting portions 12 and 13 for the ends of the egg carrying compartment troughs 50. Sloping downwardly over the top and in front of the upper horizontal row of nests may be provided a one piece roof portion 32 and upper front portion 34 which join along an obtuse angle edge 33, and preferably are provided with end flanges 38 and 40 to fit over the top and front upper vertical edges of the end sections 9 and 10. The upper front portion 34 contains equally spaced and horizontally aligned nest openings 35. Below the projecting portions 12 of the side sections 9 and 10 is provided a lower front portion or section 62 having a similar row of four horizontally aligned nest openings 35 and end flanges 40. Between each of the nest openings 35 are provided vertical separating partitions 27 so that each nest opening 35 is to a separate similar nest compartment in the structure.

The bottom of each nest comprises an open mesh-work or wire screen 47 which slopes gradually downwardly from the housing back section 2 toward the front lower corner of the forwardly projecting and adjacent egg receiving trough or compartment 50. This inclined sloping open floor 47 permits the eggs as soon as they are laid in a nest to roll downwardly into the egg receiving compartment or trough 50, as well as permitting the droppings of the fowl to fall directly below the nest onto the removable trays or pans 63 of the bottom which horizontally slide in from the front lower edges of the troughs 50 to the back section 2 of the structure and are spaced beneath the floors 47.

Over the top of each of the horizontal egg receiving troughs 50 may be provided a lid or cover 58 hinged at the front vertical edge strip 55 between the outer ends of the projecting portions 12 and 13, respectively. These two parallel hinged lids or covers 58 may be provided with finger holds 60 along their inner edges abutting against the lower front edges of the upper and lower front portions 34 and 62, respectively, so that they may readily be lifted for the gathering of eggs which may have automatically accumulated in the troughs 50.

Pivoted to the upper trough end projecting portions 12 may be a pair of levers 75 which normally extend outwardly in front of the trough and are connected by a perch bar 78 to provide a perch for the fowl along the front of each of the upper row of nests. This perch bar assembly may be pivoted in the rivet holes 16 and raised vertically so that the bar 78 blocks the openings 35 of the top row of nests to prevent the poultry from entering or coming out of these nests, as desired, or during the gathering of the eggs from their adjacent egg carrying compartment or bent screen stiffening trough 50 in there providing an egg collecting rail. A similar perch bar, but which preferably extends farther in front of the structure, may also be provided for the lower row of nests, and may be similarly pivoted to a pair of levers 79 and may have two or a pair of parallel perch bars 78 extending between the levers 79 in the front edge of the lower egg collecting trough. Similarly, this lower perch assembly may be raised vertically to block the entrances of the lower row of nests, when desired.

Around the lower interior edges of each of the nests may be provided a soft flexible material for a nest lining, such as the hemp fibers 68 for the back and two sides of the nest, and a rubber flap 67 pending from the lower edges of the upper and lower front portions 34 and 62, to separate the nests from the egg collecting troughs 50, which flaps may readily be moved and passed by an egg rolling down the sloping surface of the floor 47.

The back section 2 may be provided with a pair of hanging brackets 44 for hanging the entire structure against a wall, and the end portions and partitions may be provided with louvers 11 and apertures 28, respectively, to permit cross ventilation through the sides of the separate nest compartments in each horizontal row of nests.

Referring now to the details of construction of the above mentioned parts or sections, and portions of the structure shown in Fig. 18, reference will now be had first to Figs. 1, 2 and 6 wherein back section 2 comprises a one piece flat metal sheet having two vertically aligned apertures 6 downwardly from its upper edge into which bolts 43 may fasten the hanging brackets 44. The vertical side edges of the back section 2 are shown in Fig. 6 to be provided with J-shaped slide channel flanges 4 which cooperate with C-shaped channel flanges 24 extending along the back vertical edges of the side or end sections 9 and 10. The lower or bottom edge of the back is provided with a forwardly right angle flange 3 which acts as a support for the lower droppings tray 63, as well as the bottom of the side sections 9 and 10.

An unassembled end section 10 is shown in Fig. 5 having a top sloping edge 17 and vertical upper and lower front edges 19 and 20 above and between the forward end projecting portions 12 and 13, respectively. Along these top and front edges 17, 19 and 20 there are provided, respectively, bendable lugs or ears 18 and 21 which are adapted to fit into slots 39 and 41 in the roof or top and front portions 32, 34 and 62 and then be bent over as shown in Figs. 1, 18 and 19 to hold these sections in assembled relationship. Similar lugs or tabs 23 are provided on the further forward projecting portions 22 at the forward ends of the trough end projecting portions 12 and 13 of the side sections, which lugs 23 fit into slots 61 (see Fig. 1) in the trough front web or strip portion 55, for holding it and its attached lid 58 in its assembled relationship. The forwardly projecting portions 12 and 13 of the side sections 9 and 10 may each be provided with inwardly extending flanges 53 along their sloping upper edges to provide engaging faces for the ends of the lids or covers 58 of the egg collecting compartment; and also with outwardly projecting stops 14 to limit the horizontal position for the perch levers 75 and 79, when in their horizontal or perch providing positions. The end sections 9 and 10 as well as the back section 2 may also be provided with offset downwardly extending tongues 8 which may be employed to anchor the channels 69 of the hemp lining strips 68 for each of the nests.

On the inner side of each of the end sections 9 and 10, there may be riveted through holes 15 and 16 a diverging slide way channel supporting member, such as that shown in Fig. 7, which is located in the positions shown in dotted lines in Fig. 5. These diverging slide channel members are provided with a sloping flange 25 for supporting the end edges of the floors 47, and with a horizontal flange 26 for supporting the side edges of the droppings pans or trays 63. The higher back edge and at least part of the side edges of the mesh-work floor 47 may be provided with reinforcing strips 48 and 49, respectively (see Figs. 16 and 10) which engage the forwardly and downwardly sloping flanges 25, coacting as supporting means along the lower and higher edges of said inclined wire screen.

The droppings tray 63 shown in Fig. 8 is preferably provided with an upwardly extending back flange 64, side flanges 65, and a further upwardly extending front flange 66.

An unassembled blank of a partition 27 is shown in Fig. 9 having along its back and front edges 29 and 31, respectively, pairs of bendable lugs or tabs 30 which are to project through the slots 7 provided in the back section 2 and slots 7 provided in the upper and lower front portions 34 and 62 for anchoring the partitions in place when assembled, as well as to give rigidity to the structure. The partitions 27 may also be provided with top and bottom stiffening flanges 45 and 46, respectively (see Fig. 10), the lower flange 46 forming a J-shaped slideway for a reinforcing strip 52, which complementary slideway strips 52 are fastened to the mesh-work floors 47 between each of the nest compartments for supporting the floor between its end edges 49 in the slide in assembly normally from the front. The other side of the mesh-work 47 from the strip 52 may also be reinforced by another strip 51. These strips only extend below each of the partitions 27, and accordingly are not shown in the assembled views of Figs. 18 and 19 since they are hidden by the nest lining fibers 68.

Referring to Figs. 2 and 3, the back edge of the sloping roof or top portion 32 may be provided with a backwardly S-shaped flange 42, adapted to fit over the top edge 5 of the back section 2, through which flange may also be provided an aperture for one of the bracket supporting bolts 43 as shown in Fig. 2. The edges of the nest openings 35 may be beaded as shown at 37 to avoid any sharp edges for injuring the poultry. The lower or bottom edges of the upper and lower front portions 35 and 62, may be provided with outwardly projecting flanges 36 which act as stops for the pivoted lids or covers 58 (see Fig. 14) when in their closed positions. The side edges of the top, upper front and lower front portions 32, 34 and 62, respectively, may be provided with downwardly and backwardly projecting flanges 38 and 40 for fitting over the top and front side edges 17, 19 and 20 of the end sections as previously described and shown in Fig. 18. Through the bases of these flanges 38 and 40 may be provided suitable slots 39 and 41 for the projection of the lugs 18 and 21 for the proper assembly of these portions. The upper edge of the lower front section 62 may be provided with an inwardly extending flange 73 for supporting the front end of the upper droppings tray 63 for the upper row of nests.

Referring to Fig. 14, the front webs 55 for the egg compartments or troughs 50 are provided with inwardly lower major flanges 54, which support the front flexible edges of the mesh-work floors 47 above the trays 63 which slide under them. The upper front edges of the webs 55 are provided with flanges 56 for mounting a pair or more of hinges 57 for the lids or covers 58 to the egg receiving compartments 50. These covers 58 are provided with upwardly extending free edge flanges 59 which abut adjacent the lower edges of the upper and lower front portions 34 and 62, respectively (see dotted lines in Fig. 14). Each cover 58 may be provided with a finger hold 60 along the flange 59 to aid in raising the cover to open the trough 50.

Spaced below the lower flanges 36 of each of the upper and lower front portions or sections 34 and 62, and above the sloping mesh-work floors 47, are provided openings aligned with the base of the projecting portions 12 and 13 of the end sections 9 and 10, which openings are sufficient for an egg to roll beneath the flanges 36 along the sloping floors 47 into the egg receiving compartments or troughs 50. These openings, however, may be separated from the nest compartments by a flap of flexible material 67, such as rubber, which may be sufficiently flexible to be deflected by an egg rolling down toward the trough 50 toward the lower edge of which the wire screen extends in a vertical direction (Figs. 7, 19) to form an egg collecting rail. These flexible flaps 67 may be fastened to the lower edges of the upper and lower portions 34 and 62 by an adhesive material 74, as shown in Figs. 3 and 4.

Referring to Figs. 11, 12 and 13, the soft flexible and preferably hemp fiber lining for the back and sides or bounds means for each of the nests, may comprise a plurality of strands 68 of such fibers anchored into a U-shaped metal channel strip 69 by means of a thrusting tongue 70 held into position in the channel by suitable locking strips 72 (see Fig. 13). At substantially one third and two thirds of the length of the strips 69 are provided weakened portions 71 so that they may be readily bent from their unassembled straight form shown in Fig. 11 to their U-shaped form shown in Fig. 13 for fitting into a nest compartment. These strip nest lining assemblies may be held in place by means of the tongues 8 provided in the back section 2, side sections 9 and 10, and partitions 27. Thus, the lower regions of the nest compartments are lined with flexible soft materials to make them more like a nest for the poultry.

The pivoted perch assembly for the upper row of nests may be provided with a pair of lever arms 75 which may be pivoted to the rivets in holes 16 (which also may hold the upper pair of flange members 25, 26 in position) and may have flanges 76 through which screws 77 mount a wooden perch bar 78 extending between the outer ends of the levers 75. Similarly, the lower pivoted perch assembly may be provided with longer lever arms 79 pivoted in holes 16 corresponding to the lower rows of nests, and may be provided with a pair of perch bars 78 (see Fig. 15) fastened similarly by screws 77 to flanges 76 on the longer levers 79.

Figure 16:
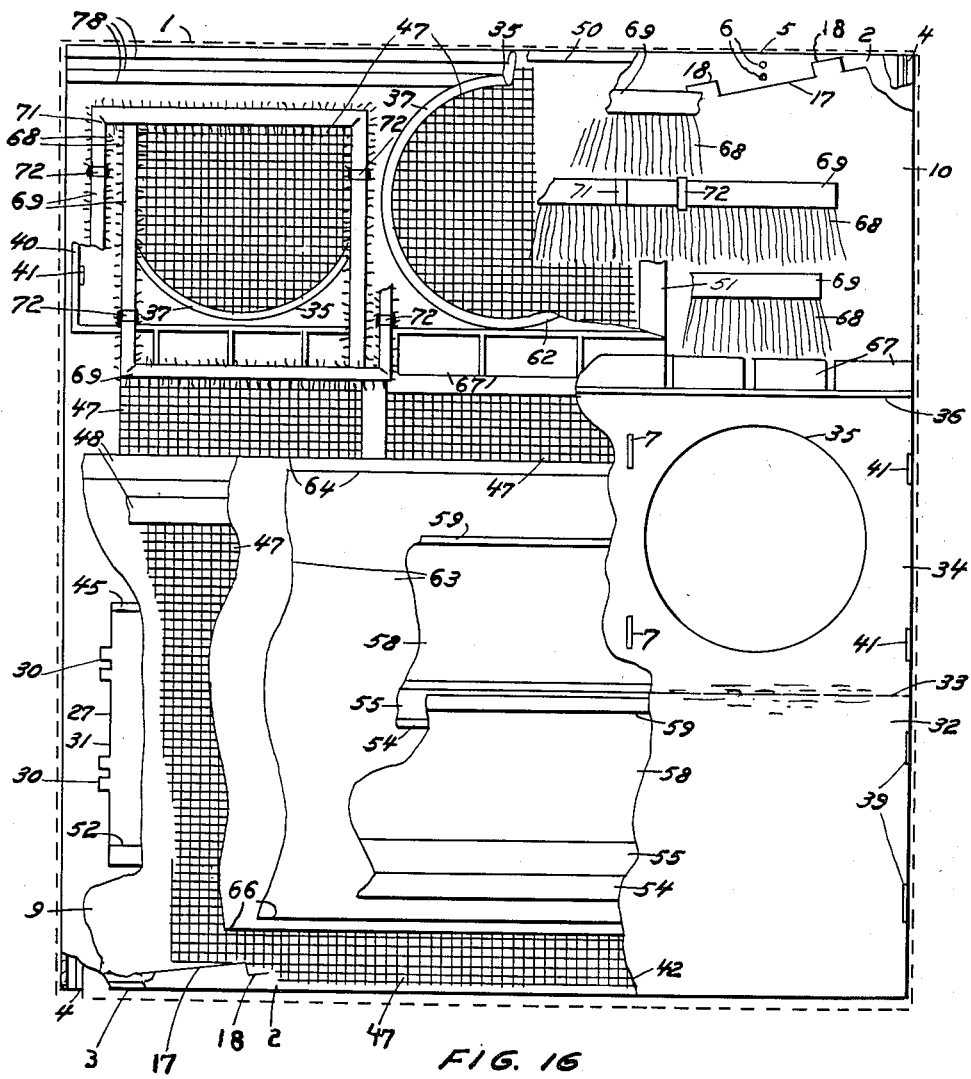
Fig. 16 is an enlarged plan view of a knock-down or preassembly grouping of the parts of the structure shown in Fig. 1, with portions of the parts broken away to disclose how they are stacked for insertion or packing into a carton.
Figure 17:
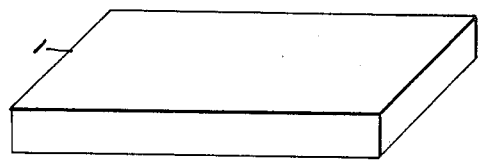
Fig. 17 is a reduced perspective view of the shape for a shipping carton for the grouping shown in Fig. 16.

The compactness with which the unassembled parts of the structure of this invention may be arranged for shipment, in a carton having the shape of carton 1 shown in Fig. 17, is shown on an enlarged scale in Fig. 16 in which all of the parts are located within the bounds of the single one piece flat back section 2 of the structure. The sheet metal employed for the back, side or end sections, partitions, top, front portions, covers, and the like, may be of galvanized sheet steel and have a range of thickness, say from No. 16 to No. 28 gauge, or may be made of other suitable metal material as desired. It is also understood that the number of nests in each row may be increased or decreased from those shown in Figs. 1 and 18 without departing from the scope of this invention.

While there is described above the principles of this invention in connection with specific apparatus, it is to be clearly understood that this description is made only by way of example and not as a limitation to the scope of this invention.

What is claimed is:

1. A sheet metal two-story poultry multi-nest self-contained structure comprising: a back, a sloping top and upper front member having a horizontal row of nest entrance openings therein, a lower front member having a similar horizontal row of nest entrance openings therein, an egg compartment below and extending forwardly of each said row of nest entrance openings, a pair of parallel ends each having a pair of frontwardly projecting egg compartment sections, a plurality of partitions parallel to said ends, each of said ends and said partitions having outwardly projecting lugs along their edges, slot means in the front and back members for insertion of said lugs for fastening the pieces of said structure together, forwardly and downwardly extending floors from said back into said forwardly projecting egg compartments, and hinged lids for said egg compartments below each row of nest openings.

2. A structure according to claim 1 including perch bars pivoted near the ends of said egg compartments and extending longitudinally in front of said compartments, said perch bars being movable from their perch providing position vertically for blocking said entrance openings of said row of nests.

3. A structure according to claim 1 wherein said ends and said partitions are provided with apertures for ventilation of said nests.

4. A structure according to claim 1 including soft flexible nest lining for the lower region of each nest compartment.

5. A structure according to claim 1 including a flexible partition extending from below said nest openings to adjacent said floors for separating said nests from said forwardly projecting egg compartments.

6. A structure according to claim 1 wherein said floors are of mesh-work and wherein said structure includes slidably removable horizontal droppings trays spaced below said floors of each row of nests.

7. A hen's nest comprising a housing having an opening to permit a hen to enter therein, means forming bounds portions for a nest within the housing, there being from said nest an opening to permit an egg to pass from the nest, said housing including spaced side walls interconnected by a front wall, two of said side walls extending below said front wall and provided adjacent their lower edges with horizontal supporting strips forming slide ways, frame means supported on said ways and slidable thereon into position in the housing below said seat, a foraminous member secured to said frame means between opposite sides and ends thereof and having from its lower forward portion an upwardly sloping ramp portion disposed below said nest bounds means portions when the frame means is in the inwardly slid position, thus forming part of the nest and, under the foraminous member, a bottom wall for receiving droppings passing thru the member from the nest.

8. A nest structure suitable for fowl to lay eggs in consisting of a housing with an inclined wire screen of pitch for eggs thereon to roll downward, a bottom to said structure below said wire screen, first means along the lower and higher edges of said inclined wire screen to support same up off said bottom, second means disposed above said inclined wire screen sufficiently to permit an egg to roll down said inclined wire screen under said second means, said housing and screen coacting in providing an extension, a collecting rail, the lower edge of said wire screen extending in a vertical direction in providing a trough, and a hinged closing third means extending from the housing and covering the section of said housing along said collecting rail.

References Cited in the file of this patent
UNITED STATES PATENTS

| | | |
|---|---|---|
| 1,581,082 | Clarke | Apr. 13, 1926 |
| 1,594,170 | Gorsuch | July 27, 1926 |
| 1,632,033 | Miller | June 14, 1927 |
| 1,671,051 | Soderquist | May 22, 1928 |
| 2,158,831 | Plant | May 16, 1939 |
| 2,494,709 | Keagle | Jan. 17, 1950 |
| 2,584,909 | Ockenfels | Feb. 5, 1952 |
| 2,633,826 | Hansen | Apr. 7, 1953 |
| 2,658,475 | Hobbs | Nov. 10, 1953 |
| 2,676,566 | Krieger | Apr. 27, 1954 |